(12) United States Patent
Ellis et al.

(10) Patent No.: US 9,671,962 B2
(45) Date of Patent: Jun. 6, 2017

(54) STORAGE CONTROL SYSTEM WITH DATA MANAGEMENT MECHANISM OF PARITY AND METHOD OF OPERATION THEREOF

(71) Applicant: SMART Storage Systems, Inc., Chandler, AZ (US)

(72) Inventors: Robert W. Ellis, Phoenix, AZ (US); Ryan Jones, Mesa, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 331 days.

(21) Appl. No.: 13/690,337

(22) Filed: Nov. 30, 2012

(65) Prior Publication Data
US 2014/0156966 A1 Jun. 5, 2014

(51) Int. Cl.
*G06F 3/06* (2006.01)

(52) U.S. Cl.
CPC ............ *G06F 3/0613* (2013.01); *G06F 3/064* (2013.01); *G06F 3/0689* (2013.01)

(58) Field of Classification Search
CPC ...... G06F 11/10; G06F 12/0246; G06F 3/067; G06F 12/00; G06F 11/1008; G06F 11/1068; G06F 3/061; G06F 3/0619
USPC ........................................................ 711/114
See application file for complete search history.

(56) References Cited

U.S. PATENT DOCUMENTS

| 4,048,481 | A | 9/1977 | Bailey, Jr. et al. |
| 4,839,587 | A | 6/1989 | Flatley et al. |
| 5,034,744 | A | 7/1991 | Obinata |
| 5,210,854 | A | 5/1993 | Beaverton et al. |
| 5,311,395 | A | 5/1994 | McGaha et al. |
| 5,450,354 | A | 9/1995 | Sawada et al. |
| 5,479,638 | A | 12/1995 | Assar et al. |
| 5,784,174 | A | 7/1998 | Fujino et al. |
| 5,790,828 | A | 8/1998 | Jost |
| 5,930,504 | A | 7/1999 | Gabel |
| 5,949,785 | A | 9/1999 | Beasley |
| 5,963,983 | A | 10/1999 | Sakakura et al. |
| 6,034,897 | A | 3/2000 | Estakhri et al. |
| 6,069,827 | A | 5/2000 | Sinclair |
| 6,091,652 | A | 7/2000 | Haehn et al. |
| 6,275,436 | B1 | 8/2001 | Tobita et al. |

(Continued)

FOREIGN PATENT DOCUMENTS

| EP | 1 956 489 A2 | 8/2008 |
| EP | 1 990 921 A2 | 11/2008 |

(Continued)

OTHER PUBLICATIONS

Online Merriam Webster Dictionary, defintion of "Distinct" from Jun. 12, 2011, https://web.archive.org/web/20110612181129/http://www2.merriam-webster.com/cgi-bin/mwdictadu?book=Dictionary&va=distinct.*

(Continued)

*Primary Examiner* — Prasith Thammavong
*Assistant Examiner* — Alex Olson
(74) *Attorney, Agent, or Firm* — Morgan, Lewis & Bockius LLP

(57) ABSTRACT

A method of operation of a storage control system includes: partitioning memory channels with memory devices; selecting a super device with one of the memory devices from one of the memory channels; selecting a super block associated with the super device; and determining a location of a parity within the super block when the super block is formed.

22 Claims, 8 Drawing Sheets

(56) References Cited

U.S. PATENT DOCUMENTS

| | | |
|---|---|---|
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Perlmutter et al. |
| 8,010,738 B1 | 8/2011 | Chilton et al. |
| 8,028,123 B2 | 9/2011 | Kiizer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 * | 8/2012 | Olbrich et al. ............... 714/753 |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 9,201,728 B2 | 12/2015 | Patapoutian et al. |
| 2002/0056025 A1 | 5/2002 | Qiu et al. |
| 2002/0156891 A1 * | 10/2002 | Ulrich et al. ............... 709/225 |
| 2002/0159285 A1 | 10/2002 | Morley et al. |
| 2003/0033308 A1 * | 2/2003 | Patel et al. ............... 707/10 |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 * | 4/2006 | Arai et al. ............... 711/114 |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 * | 10/2008 | Hosoya et al. ............... 711/154 |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0146721 A1 | 6/2009 | Kurooka et al. |

(56) References Cited

U.S. PATENT DOCUMENTS

| | | |
|---|---|---|
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 | 4/2010 | Heo et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1* | 9/2010 | Fukutomi et al. ............ 714/764 |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0173395 A1 | 7/2011 | Bhattacharjee et al. |
| 2011/0190963 A1 | 8/2011 | Glassl et al. |
| 2011/0191522 A1 | 8/2011 | Condict et al. |
| 2011/0191649 A1* | 8/2011 | Lim et al. ............ 714/752 |
| 2011/0209032 A1 | 8/2011 | Choi et al. |
| 2011/0238892 A1 | 9/2011 | Tsai et al. |
| 2011/0239088 A1* | 9/2011 | Post ............ 714/763 |
| 2011/0258496 A1 | 10/2011 | Tseng et al. |
| 2011/0314219 A1* | 12/2011 | Ulrich et al. ............ 711/114 |
| 2011/0320687 A1 | 12/2011 | Belluomini et al. |
| 2012/0008401 A1 | 1/2012 | Katz et al. |
| 2012/0011336 A1* | 1/2012 | Saika ............ 711/162 |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1* | 3/2012 | Yochai et al. ............ 711/114 |
| 2012/0079348 A1 | 3/2012 | Naeimi |
| 2012/0079355 A1 | 3/2012 | Patapoutian et al. |
| 2012/0096217 A1* | 4/2012 | Son et al. ............ 711/103 |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0203951 A1 | 8/2012 | Wood et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1* | 10/2012 | Storer et al. ............ 714/1 |
| 2012/0266048 A1 | 10/2012 | Chung et al. |
| 2012/0278530 A1 | 11/2012 | Ebsen |
| 2012/0278531 A1* | 11/2012 | Horn ............ 711/103 |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0232290 A1 | 9/2013 | Ish et al. |
| 2013/0238833 A1* | 9/2013 | Vogan et al. ............ 711/103 |
| 2013/0265825 A1 | 10/2013 | Lassa |
| 2013/0297986 A1 | 11/2013 | Cohen |
| 2013/0297988 A1 | 11/2013 | Wu et al. |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1* | 5/2014 | Zaltsman et al. ............ 714/6.11 |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0372777 A1 | 12/2014 | Reller et al. |
| 2015/0177999 A1 | 6/2015 | Gakhal et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 A1 | 4/2009 |
| WO | WO 2011/156466 | 12/2011 |

OTHER PUBLICATIONS

Cooke, "Introduction to Flash Memory (T1A)," Flash Memory Summit, Aug. 22, 2008, Micron Technology, Inc., 102 pages.

Gal at al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006, pp. 1-21.

O'Brien, "SMART Storage Systems Optimus SAS Enterprise SSD Review" SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC for Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

International Search Report and Written Opinion dated Nov. 7, 2014, received in International Patent Application No. PCT/

(56) References Cited

OTHER PUBLICATIONS

US2014/049732, which corresponds to U.S. Appl. No. 14/334,350, 13 pages (Fitzpatrick).
International Search Report and Written Opinion dated Oct. 17, 2014, received in International Patent Application No. PCT/US2014/049734, which corresponds to U.S. Appl. No. 14/337,259, 8 pages (Higgins).
International Search Report and Written Opinion dated Oct. 23, 2014, received in International Patent Application No. PCT/US2014/049736, which corresponds to U.S. Appl. No. 14/446,249 8 pages (Fitzpatrick).
International Search Report and Written Opinion dated Nov. 5, 2014, received in International Patent Application No. PCT/US2014/049282, which corresponds to U.S. Appl. No. 13/957,407, 12 pages (Fitzpatrick).
Ulinktech, "ATA Command Table (in Alphabetic Order)." Feb. 6, 2011, https://web.archive.org/web/20110206060820/http://www.ulinktech.com/downloads/AT, 6 pages.
International Search Report and Written Opinion dated May 14, 2014, received in International Patent Application No. PCT/US2014/017168, which corresponds to U.S. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
International Search Report dated Mar. 25, 2014, received in International Patent Application No. PCT/US2013/072400, which corresponds to U.S. Appl. No. 13/690,337, 3 pages (Ellis).
International Search Report and Written Opinion dated Jun. 12, 2014, received in PCT/US2014/018972, which corresponds to U.S. Appl. No. 13/779,352, 12 pages (Schmier).
Invitation to Pay Additional Fees dated Jul. 25, 2014, received in International Patent Application No. PCT/US2014/021290, which corresponds to U.S. Appl. No. 13/791,797, 9 pages (Dean).
International Search Report and Written Opinion dated Jul. 31, 2014, received in International Patent Application No. PCT/US2014/031465, which corresponds to U.S. Appl. No. 13/851,928, 13 pages (Ellis).
International Search Report and Written Opinion dated Jul. 31, 2014, received in International Patent Application No. PCT/US2014/033876, which corresponds to U.S. Appl. No. 13/861,326, 9 pages (Fitzpatrick).
Narayanan et al., "Migrating Server Storage to SSDs: Analysis of Tradeoffs," Computer Systems, Apr. 2009, 12 pages.
Shiraz et al., "Block Aging Prevention Technique (BAP) for Flash Based Solid State Disks," 7th International Conference on Emerging Technologies (ICET), Sep. 5, 2011, 6 pages.
Tai et al, "Prolongation of Lifetime and the Evaluation Method of Dependable SSD," 25 International Symposium on Defect and Fault Tolerance in VLSI Systems, 2010, NJ, USA, 8 pages.
Yimo et al., "WeLe-RAID: A SSD-Based RAID for System Endurance and Performance," Jan. 2011, Network and Parallel Computing, Springer, 14 pages.
International Search Report and Written Opinion dated Jan. 9, 2015, received in International Patent Application No. PCT/US2014/049731, whcih corresponds to U.S. Appl. No. 14/334,324, 9 pages (Fitzpatrick).
International Search Report and Written Opinion dated Feb. 18, 2015, received in International Application No. PCT/US2014/065401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).
Tseng et al., "Understanding the Impact of Power Loss on Flash Memory," DAC'11, Jun. 5-10, 2011, San Diego, California, 6 pages.
International Search Report and Written Opinion dated Aug. 22, 2014, received in International Patent Application No. PCT/US2014/032978, which corresponds to U.S. Appl. No. 14/081,992, 10 pages (Ellis).

* cited by examiner

STORAGE CONTROL SYSTEM WITH DATA MANAGEMENT MECHANISM OF PARITY AND METHOD OF OPERATION THEREOF

TECHNICAL FIELD

The present invention relates generally to a storage control system and more particularly to a system for data management of parity.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells. The memory transistors of those cells are placed to store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: partitioning memory channels with memory devices; selecting a super device with one of the memory devices from one of the memory channels; selecting a super block associated with the super device; and determining a location of a parity within the super block when the super block is formed.

The present invention provides a storage control system, including: a channel module for partitioning memory channels with memory devices; a device module, coupled to the channel module, for selecting a super device with one of the memory devices from one of the memory channels; a block module, coupled to the device module, for selecting a super block associated with the super device; and a parity module, coupled to the block module, for determining a location of a parity within the super block when the super block is formed.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
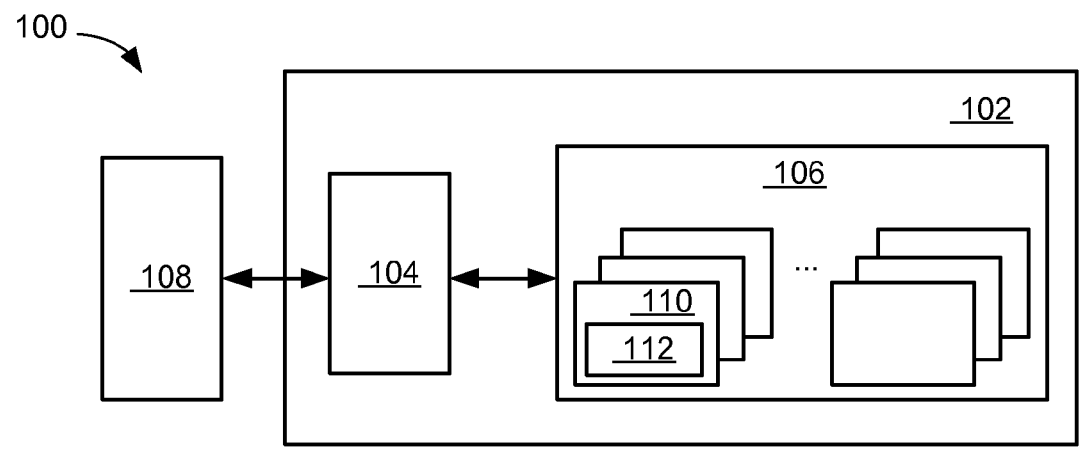
FIG. 1 is a storage control system with data management mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Referring now to FIG. 1, therein is shown a storage control system 100 with data management mechanism in an embodiment of the present invention. The storage control system 100 includes a memory sub-system 102 having a memory controller 104 and a memory array 106. The storage control system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to a logical address space of a storage device or the memory sub-system 102 that includes the memory array 106.

The memory devices 110 can include chip selects 112, which are defined as control inputs, for enabling the memory devices 110. Each of the chip selects 112 can be used to control the operation of one of the memory devices 110. Each of the chip selects 112 can be used to control sub addresses or logical units (LUN) within each of the memory devices 110. When the chip selects 112 are enabled, the memory devices 110 are in active state for operation including reading, writing, or erasing.

Figure 2:
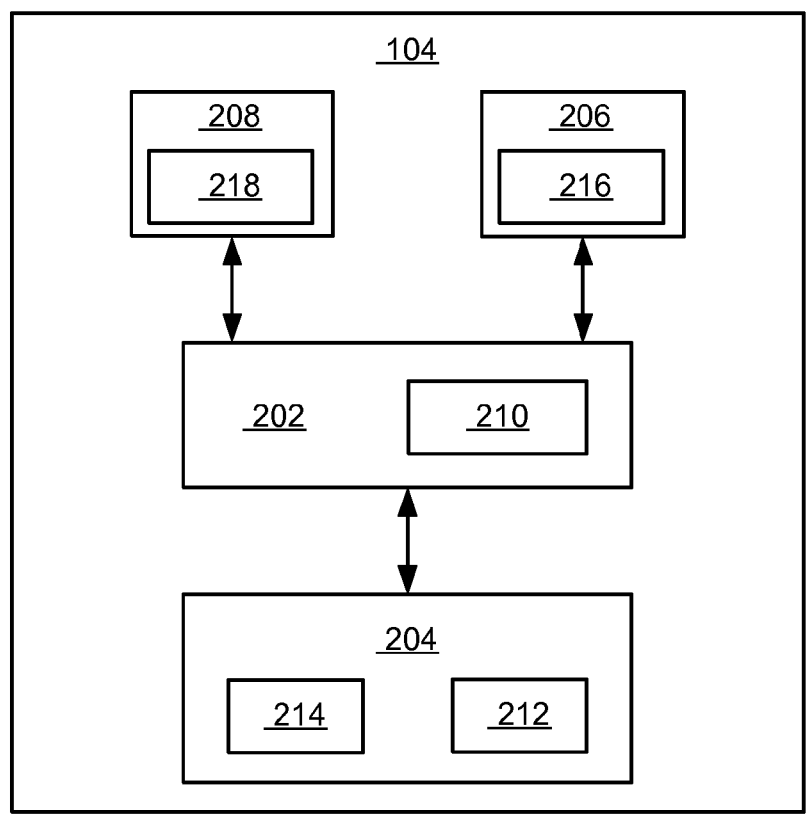
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
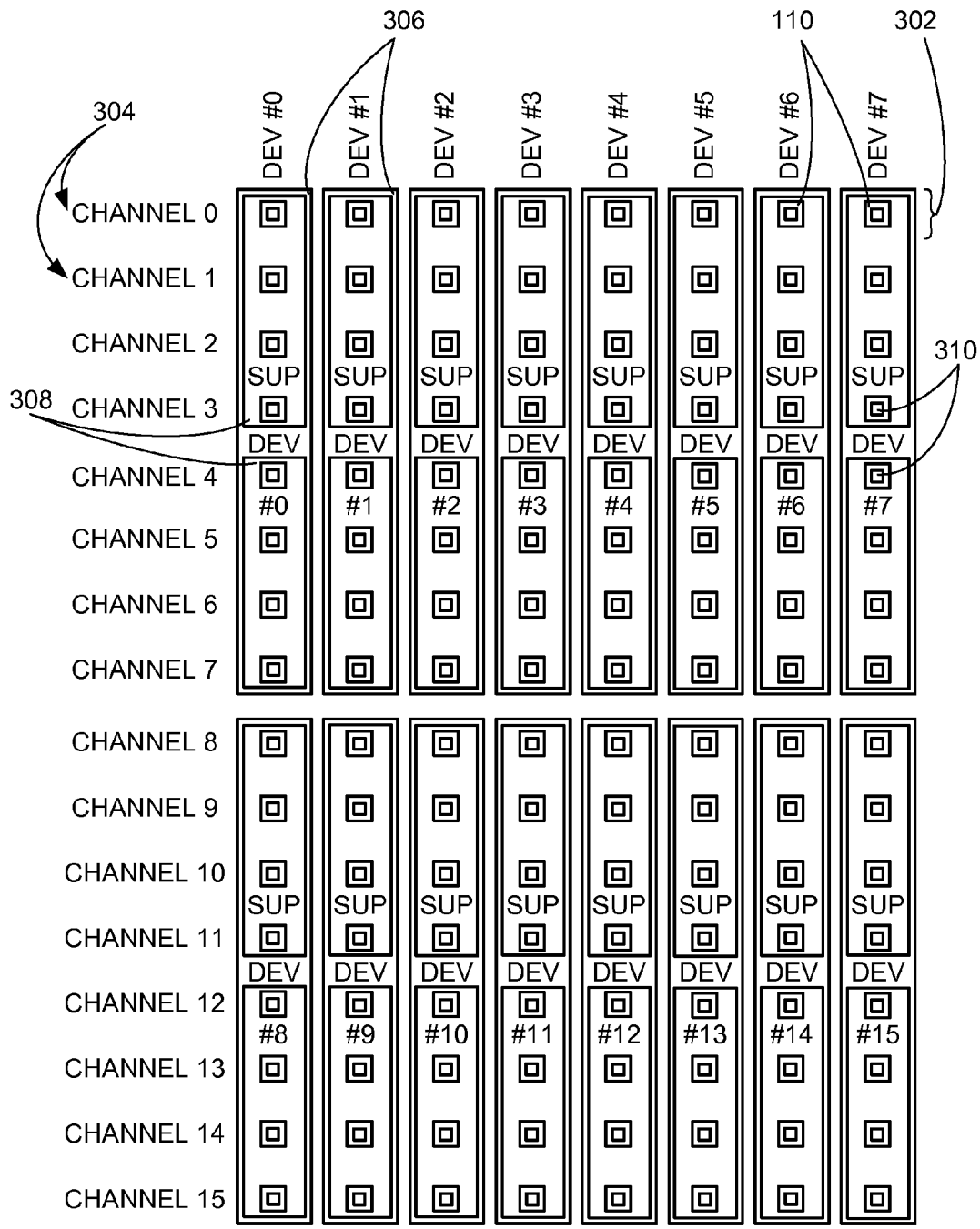
FIG. 3 is an example diagram of memory groups of the memory devices.

Referring now to FIG. 3, therein is shown an example diagram of memory groups 302 of the memory devices 110.

The memory groups 302 are defined as logical association or grouping of physical instances of the memory devices 110. The term "logical" refers to non-physical and thus does not represent the physical configuration of the memory devices 110.

Each of the memory groups 302 can be identified as being associated with a number of the memory devices 110. Although each of the memory groups 302 is shown associated with eight of the memory devices 110 for illustration purposes, it is understood that each of the memory groups 302 can be associated with any number of the memory devices 110.

Each of the squares in FIG. 3 is one of the memory devices 110, which can represent independently controllable memory devices. For example, for NAND flash memories, the memory devices 110 can represent dies or logical units (LUN). An important point is that the memory devices 110 can execute commands independently from each other allowing parallel operations. This independent operation is used to gain greater bandwidths and high I/O operations (IOPS).

Each of memory channels 304 can be associated with a number of the memory devices 110. Each of the memory channels 304 is defined as a physical bank or a physical group of the memory devices 110 that share a common data bus and a common set of associated control signals.

The memory channels 304 can represent an independent bus or communication path. Each of the memory channels 304 can represent an independent execution unit. Each of the memory channels 304 can include an ability to perform independent and parallel operations with respect to other instances of the memory channels 304.

Actions, commands, and status information transmitted within one of the memory channels 304 can be limited to the memory devices 110 that are connected to the one of the memory channels 304 and can be independent from other instances of the memory channels 304 within a storage device. Data bus and control signals of one of the memory channels 304 cannot be shared with the other instances of the memory channels 304.

Each of the memory channels 304 can include a number of bits of data based on a type of the memory devices 110. For example, each of the memory channels 304 can include 8 bits, 16 bits, or any number of bits of data bus depending on the type of the memory devices 110 used and the construction of the memory controller 104 of FIG. 1. Also for example, the memory channels 304 can represent physical channels.

For example, one of the memory channels 304 can control or have ownership of a set of the memory devices 110 that share a common data bus and control signals. Also for example, the memory devices 110 can represent flash devices or flash components that independently operate from each other.

The super devices 306, which are defined as groups of the memory devices 110, can be identified or selected. The super devices 306 can include portions or all of the memory channels 304. The super devices 306 can be selected with one of the memory devices 110 from one of the memory channels 304. The term "super" in the super devices 306 refers to a group of multiple hardware instances of the memory devices 110.

The memory devices 110 from the memory channels 304 can be grouped to form the super devices 306. For example, if there are 16 of the memory channels 304 and 8 of the memory devices 110 per each of the memory channels 304, there can be 8 of the memory devices 110, one from each of the memory channels 304, grouped together for each of the super devices 306 and 16 of the super devices 306 as shown in FIG. 3. The super devices 306 can include a number of the memory devices 110 that are controlled in parallel across a number of the memory channels 304. The super devices 306 can be constructed with or associated with any number of the memory channels 304 that are executed in parallel.

The super devices 306 can also include multiple of the memory devices 110 from each of the memory channels 304. At least one of the super devices 306 can be formed by taking multiple passes through the memory channels 304. In addition, at least one of the super devices 306 can span the memory channels 304 as much as possible but it is not strictly bounded by the memory channels 304.

Each of the super devices 306 can be associated with one of the memory devices 110 from each of the memory channels 304. Although each of the super devices 306 is shown having 8 of the memory devices 110 for illustration purposes, it is understood that each of the super devices 306 can include any number of the memory devices 110. For example, each of the super devices 306 can include up to a number of the memory channels 304. Also for example, all of the super devices 306 can have the same structure and size. Each of the super devices 306 can include any number of the memory devices 110 per each of the memory channels 304. In this case, there can be multiple passes made or accessed through the memory channels 304. For example, each of the super devices 306 can include a number of the memory channels 304 with 2 of the memory devices 110 per each of the memory channels 304.

Each of the super devices 306 can include one of the memory devices 110 from each of the memory channels 304. Each of the super devices 306 can include a number of the super blocks 308, each of which can include a number of erase blocks 310 (EB). The super blocks 308 are defined as logical groupings of the erase blocks 310 in the memory devices 110. Although there are 16 of the super devices 306 shown for illustration purposes, there can be any number of the super devices 306 identified. The number of the super devices 306 can be based on a number of independently accessible instances of the memory devices 110 on the memory channels 304 selected by Chip Enables (CEs), logical units (LUN), or a combination thereof.

The erase blocks 310 are units of a non-volatile memory device or other types of block oriented non-volatile memory devices. For example, the erase blocks 310 can be one of atomic units of a NAND flash memory device or other types of block oriented non-volatile memory devices, which no finer control over erasing memory elements is capable. Also for example, the erase blocks 310 can form a part of a logically addressable memory space within a NAND flash or other type of block oriented non-volatile memory devices.

The erase blocks 310 can represent the smallest unit of memory that can be erased. The memory devices 110 can represent NAND packages that can include multiple dies or logical units (LUN).

As an example, each of the super devices 306 can access one of the super blocks 308 at any given instance. Each of the super blocks 308 can include a number of the erase blocks 310 that are accessible by one of the super devices 306 at any given time. There can be one of the erase blocks 310 active for each of the memory channels 304 within one of the super devices 306. The erase blocks 310 can be assigned across the memory channels 304 so that they can be accessed in a parallel approach. One of the erase blocks 310 can be assigned per each of the memory channels 304 to form one of the super blocks 308 in the super devices 306.

In an example of one of the super devices 306 having 8 of the memory devices 110, there can be 8 active instances of the erase blocks 310 associated with the one of the super devices 306. The 8 active instances of the erase blocks 310 can belong to a specific instance of the super blocks 308. Also as an example, there can be multiple active instances of the erase blocks 310 per each of the memory devices 110.

The present invention can include architecture and use of the memory devices 110 including NAND flash or other block oriented non-volatile memory organized in efficient groups to reduce the overhead of and runtime management in a solid state storage device. The present invention can include the super blocks 308 as an organization of memory blocks for parallel use by multiple memory controllers and the logical and physical linkage between the memory blocks. The present invention can provide additional organization for data protection via RAID operations with reduced overhead for both runtime recycling and drive initialization speed. The present invention can provide an additional structure for managing bad block memory elements without detriment or loss of system performance or efficiency.

The super blocks 308 provide the following effects. One of the effects is amount of metadata that is stored in each of the erase blocks 310 is minimized or reduced. The metadata can now be stored at a super-block level or in one of the super blocks 308. Another of the effects is fewer number of the erase blocks 310 are managed as well as reduction in time to initialize these data structures.

For example, the metadata can include non-host related information including logical-to-physical mapping information of the host data within the memory devices 110. Also for example, the metadata can include non-host related information including logical block address (LBA) information, super block identification (ID) values, program/erase (PE) cycles, aging data, and other NAND statistics that is collected as a consequence of normal operations.

Another of the effects is the host data is written to the super blocks 308 in a deterministic order. Another of the effects is recycling can traverse or access the super blocks 308 in the same order by which the host system 108 of FIG. 1 writes data. As a result, recycling operations can preserve the same order used in write operations providing data striping for optimal read-back performance.

It has been discovered that the super devices 306 provide improved performance by grouping of the memory devices 110 that are controlled in parallel across a number of the memory channels 304.

Figure 4:
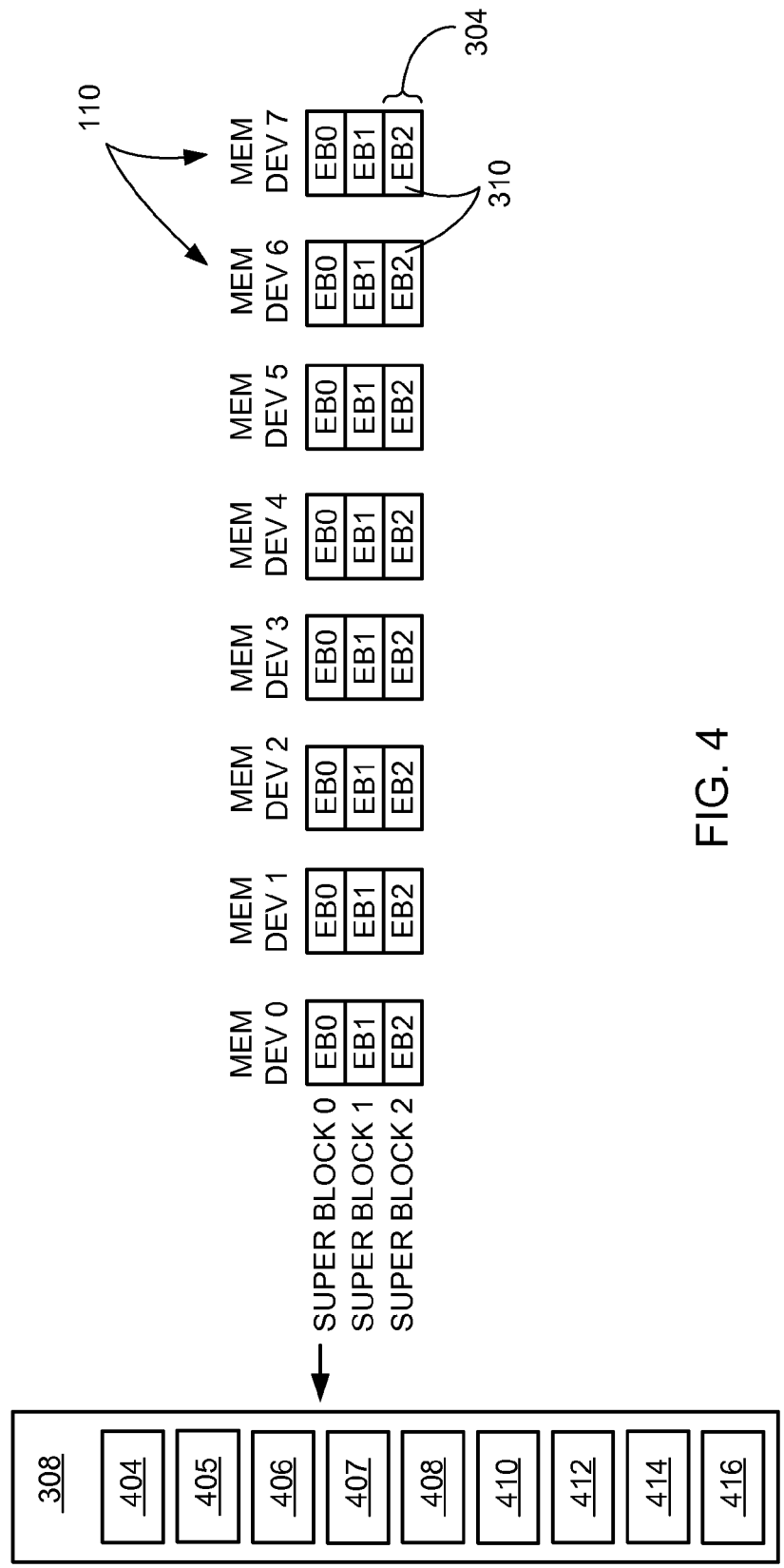
FIG. 4 is an example diagram of the super blocks.

Referring now to FIG. 4, therein is shown an example diagram of the super blocks 308. The groups of the erase blocks 310 can be operated as one virtual erase block, which can be included within one of the super devices 306 of FIG. 3. The super blocks 308 allow the management of a group of individual physical instances of the erase blocks 310 as though it was one larger erase block. Actions including host writes, recycling operations, or erasing of blocks can be performed on a set of the erase blocks 310 included within one of the super blocks 308 as a single unit.

Each of the super blocks 308 is a group of the erase blocks 310 that span across multiple of the memory channels 304 within one of the super devices 306. As an example, each of the memory devices 110 in the super blocks 308 can contribute a pair of the erase blocks 310 that can be accessed together. Each of the super blocks 308 can be selected to be associated with the super devices 306. Each of the super blocks 308 can be accessed via and associated with only one of the super devices 306. Since the super devices 306 span across multiple of the memory channels 304, the super blocks 308 can also span across multiple of the memory channels 304. The term "spanning across" used above for the super blocks 308 refers to portions of different instances of the memory channels 304 are included in each of the super blocks 308.

There can be a number of the super devices 306 included in a solid-state drive or a storage system dictated by a number of addressable elements within the memory channels 304 that can be controlled in a parallel method of operation. There can be a number of the super blocks 308 per each of the super devices 306. Any of the super blocks 308 can be associated with one and only one of the super devices 306.

All the chip selects 112 of FIG. 1 of the memory devices 110 can be partitioned into groups that can be controlled by super chip selects 404. The super chip selects 404 can be selected by partitioning the chip selects 112. The super chip selects 404 are defined as groups of the chip selects 112 that are associated with the erase blocks 310 that form the corresponding instances of the super blocks 308.

One of the super chip selects 404 is selected to be associated with one of the super blocks 308 and a group of the chip selects 112 of the memory devices 110 that are associated with the one of the super blocks 308. The one of the super chip selects 404 can be used to control the group of the chip selects 112. The super chip selects 404 are associated with the super blocks 308. The super chip selects 404 are provided to control operation of the memory devices 110.

The super chip selects 404 can be used to assert or de-assert the chip selects 112. The chip selects 112 can be asserted or de-asserted to enable or disable, respectively, the memory devices 110. For example, the chip selects 112 can be asserted or de-asserted by assigning the super chip selects 404 to an active or inactive state such that the chip selects 112 are driven to logic '1' or '0', respectively, to enable or disable the memory devices 110.

Each of the super blocks 308 can span or include only one of the super chip selects 404. By having multiple of the super chip selects 404 for multiple of the super blocks 308, one of the super chip selects 404 can be available for writing host data 405 from the host system 108 of FIG. 1 to the memory array 106 of FIG. 1 and another of the super chip selects 404 can be provided for reading and writing recycling data to the memory array 106. The host data 405 is defined as information provided by the host system 108. The host data 405 is the host data described in FIG. 3 above.

The partition of the chip selects 112 and the provision of the super chip selects 404 eliminate conflict between host write and block erase operations because these operations are performed with difference instances of the super chip selects 404. Furthermore, conflict between host read and host write (or recycle) operations can also be eliminated by mutual exclusion between operations on the super chip selects 404.

If there are several pending host reads, there is a good chance that one of them can be located on one of the super chip selects 404 that are idle. If data requested for a host read operation was written by a large-block host write operation, there is a good chance that all the data can be read with one of the super chip selects 404 that was used for the large-block host write operation.

The last instance of the erase blocks 310 at the end of one of the super blocks 308 can be written. The last instance of the erase blocks 310 can be written with a parity 406 for RAID-5 architectures. As such, the size of each of the super blocks 308 can determine the overhead in the RAID-5 architectures. The last instance of the erase blocks 310 is the last block to be accessed in the order by which the erase blocks 310 in the super blocks 308 are written by the host system 108. RAID-5 refers to an implementation for redundant array of independent disks (RAID) systems that uses block-level striping with parity data distributed across all member disks.

The parity 406 is defined as redundancy data that is used to rebuild or reconstruct a memory array to recover lost or corrupt data. The parity 406 is used as a form of error detecting code. The parity 406 can be calculated using exclusive-OR (XOR) binary operation performed on the data to be stored.

An allocation of the erase blocks 310 within one of the super blocks 308 can provide additional area for storage of the parity 406 including RAID parity data. The parity 406 can only be complete after a full stripe across all the erase blocks 310 within the super blocks 308 are written. The parity 406 can be stored within one of the super blocks 308.

Other effects include, for RAID-5 operations, the last of the erase blocks 310 in the super blocks 308 can be reserved for parity bits. As a result, parity pages are recycled along with data pages. Having the parity pages in a dedicated instance of the erase blocks 310, possibility of read disturb on these pages is significantly reduced.

The parity pages can be read only if there is an error correction code (ECC) error in one of the data pages in the super blocks 308. The parity pages can only be used in a case of an uncorrectable error and thus can have an extremely low read count, making them less susceptible to read disturb issues. Data retention in parity blocks can be better than that of data blocks in the super blocks 308 that are read a large number of times.

A read disturb in the memory devices 110 is a change of values of memory cells by an act of reading a memory cell or other memory cells within the memory devices 110. For example, in a NAND flash, read disturbs can be limited to cells within one of the erase blocks 310. An example of this is reading from one page of memory within one of the erase blocks 310 in the memory devices 110 can corrupt and change memory cells in other pages within the one of the erase blocks 310. The read disturb affect refers to the process of reading memory will create errors in the memory. Read disturbs are not always permanent and can be corrected when the memory is rewritten.

Each time a page is read in one of the erase blocks 310, a small amount of charge change is experienced by other pages within the one of the erase blocks 310. Therefore, by reading pages in one of the erase blocks 310, the bit error rate (BER) of the other pages can increase. By locating the RAID-5 parity data in the erase blocks 310 other than the erase blocks 310 being used for user data, the parity data does not suffer the same read disturbs as the normal data.

Read-write and read-erase conflicts can be minimized. The conflicts can be minimized by partitioning the super blocks 308 using the super chip selects 404. By rebalancing the super blocks 308 when recycling, a number of valid pages can be rebalanced between the chip selects 112.

There are positive factors of having the super blocks 308. The positive factors include fewer blocks to manage, fewer pages of metadata 407, infrastructure support for a RAID-5 implementation, and minimization of writes to a logical-to-physical (L2P) log during recycling. The metadata 407 is defined as non-host related information that is in addition to and stored along with host data and that aids or supports retrieval, organization, health of, and current condition or state of the memory devices 110. The metadata 407 is the metadata described in FIG. 3 above.

The metadata 407 can be written to include logical page indexes. Pages of the metadata 407 can be grouped and written once per each of the super blocks 308 as opposed to keeping the metadata 407 in each of the erase blocks 310. This grouping of the metadata 407 can also make traversing it during drive initialization more efficient.

As an example, there can be transient metadata held or stored in the storage unit 204 of FIG. 2 with a Random access memory (RAM), a Static random-access memory (SRAM), and a double data rate random access memory (DDRAM). As another example, there can be persistent metadata held or stored in the memory devices 110.

The memory devices 110 that form the super devices 306 can be fixed through the life of a storage drive. It is understood that this assignment of the memory devices 110 to the super devices 306 can be determined in a number of ways because there can be unpopulated instances of the memory devices 110 in the storage drive.

Although there are three of the super blocks 308 shown in FIG. 4, it is understood that there can be any number of the super blocks 308 in the storage control system 100 of FIG. 1. The super blocks 308 can be formed in each of the super devices 306. For example, since the super blocks 308 spans multiple of the memory channels 304, 8 pages within one of the super blocks 308 can be concurrently written.

A number of concurrent writes can be per logical unit (LUN) or dies. Each of the pages can be specifically on separate instances of the memory channels 304, or LUNs, and not just within one of the erase blocks 310.

Multiple of the erase blocks 310 grouped into each of the super blocks 308 provide several advantages. One of the advantages is that there are fewer of the super blocks 308 than a number of the erase blocks 310 to manage and initialize. Instead of managing lists of the erase blocks 310, lists of the super blocks 308 can be managed. As a result, data management resources including management data structures for managing the super blocks 308 are smaller or less.

By creating the super blocks 308 that span multiple of the chip selects 112 of the memory devices 110, additional advantages are achieved. One advantage is that the super blocks 308 provide an infrastructure that supports an internal redundant array of independent disks (RAID) architecture including RAID-5. The super blocks 308 can be created in a way that facilitates efficient host performance, recycling, RAID, and load balancing.

The term "internal" used above for RAID refers to RAID within and specific to one of the super blocks 308. RAID parity information can be part of and limited to contents of the one of the super blocks 308. As such, operations to the one of the super blocks 308 self-contained with respect to providing RAID error protection to the host data 405 and any stored metadata information.

A number of the erase blocks 310 in each of the super blocks 308 can be determined by the super devices 306. For example, each of the super blocks 308 can include at least 16 of the erase blocks 310. Another advantage of the super blocks 308 is that the super blocks 308 can include a number of the erase blocks 310 that are bad or remapped. If one of the super blocks 308 includes a number of the erase blocks 310 that are bad blocks, the entirety of the one of the super blocks 308 would not be rendered as useless. The erase blocks 310 that are bad or unusable can be remapped.

Within one of the super blocks 308, each of the erase blocks 310 does not have to be associated with the same erase block number (or address) in each of the elements. As an example, a portion of the 23rd instance of the super blocks 308 can include a number of the erase blocks 310 as follows.

Channel 0, CE0, LUN0, erase block 23
Channel 1, CE0, LUN0, erase block 23
Channel 2, CE0, LUN0, erase block 25
Channel 3, CE0, LUN0, erase block 23
Channel 3, CE0, LUN0, erase block 27

In this example, "Channel" is a corresponding channel number of the memory channels 304, "CE0" is chip enable 0, "LUN0" is logical unit 0, and "erase block" is an nth instance of the erase blocks 310.

Holes in contiguous addressing of erase blocks will exist from both factory marked bad erase blocks and erase blocks that have been determined to be bad during normal operation of the storage device. Remapped specifically refers to the substitution of one physical erase block for another.

Implementation of RAID-5 presents significant problems for recycling because parity pages need to be recycled or regenerated along with data pages. Parity data does not get relocated with the valid data during recycling. Instead, the parity data can be regenerated when recycle writes are performed. By implementing RAID within the super blocks 308, data and parity pages are recycling together.

The super blocks 308 also provide a way for a recycling operation to traverse data in the order by which that data is written. This operation minimizes the number of writes to the logical-to-physical log, especially when the host system 108 writes larger data blocks.

Other advantages include fewer statistics, which can be included in metadata pages 408, need to be managed. These statistics can include a program-erase count 410 and a valid-page count 412. There can be fewer of the metadata pages 408. The metadata pages 408 are defined as memory components within each of the erase blocks 310 that are programmed as individual units for the metadata 407.

The program-erase count 410 is defined as a numerical value indicating a number of times or cycles the memory devices 110 associated with the corresponding instances of the super blocks 308 are programmed or erased. The valid-page count 412 is defined as a numerical value indicating a number of pages that are valid in each of the super blocks 308.

Since the host data 405 can be written in the order it arrives from the host and because all data pages within the memory devices 110 can be written sequentially and contiguously, one or more new version of the same host logical sector can exist within the super blocks 308. In this case, only one of the host sectors can be valid, making other copies in the super blocks 308 invalid. The valid state of the pages within one of the super blocks 308 can be held in both the metadata pages 408 stored within the super blocks 308 and in the logical-to-physical (L2P) tabling system within the runtime volatile memory in the storage device.

Each of the super blocks 308 can include one of the metadata pages 408. Each of the metadata pages 408 can span multiple physical pages and is not limited to a single physical page depending on a number of elements in each of the super blocks 308 and the amount of metadata required for each element. Each of the super blocks 308 can include only one of the metadata pages 408. The metadata pages 408 can include logical page indexes of the super blocks 308. If the size of the super blocks 308 is properly determined, each of the metadata pages 408 can have a size that matches a size of a physical page in the memory devices 110.

The metadata pages 408 can include any additional information stored along with the host data 405 that can aid in retrieval, organization, health of, and current condition or state of the memory devices 110. The metadata pages 408 can include but is not limited to a logical to physical mapping information of the host data 405 within the memory devices 110. The metadata pages 408 that are held within one of the super blocks 308 can represent metadata specific to the one of the super blocks 308.

During portions of drive operations such as but not limited to drive initialization, the metadata pages 408 can be used to restore a host logical to physical mapping of data and a valid state of data stored within the one of the super blocks 308. The metadata pages 408 can also be used for storing the health and use status of the super blocks 308. The metadata pages 408 can be used to record the current recycling or runtime state of the super blocks 308.

Recycling operations can traverse or access data by following the same order by which host-write operations follow. As such, the original striping can be preserved. A number of operations for writing to the L2P log can be minimized.

The super-block organization is conducive to implementing RAID 4 within the storage drive. The last instance of the erase blocks 310 in each of the super blocks 308 can include parity pages. For example, parity can be generated using exclusive-OR operations (XOR). The memory controller 104 of FIG. 1 can include support for initializing, building, and writing the parity pages.

Factory and run-time defects can be handled. If one or more of the erase blocks 310 within one of the super blocks 308 is bad, the one or more of the erase blocks 310 can be removed from the one of the super blocks 308. In addition, bad instances of the erase blocks 310 in the one of the super blocks 308 can be skipped or ignored.

Statistics for the erase blocks 310 can be used to estimate remaining lifetime of the storage drive or to extend the life of the storage drive if the super blocks 308 are provided with erase-block granularity. Depending on how the memory devices 110 are populated in the storage drive with reduced capacity, the chip selects 112 of the memory devices 110 that are not used can be processed.

Each of the super blocks 308 can include the program-erase count 410. The program-erase count 410 and the valid-page count 412 can be managed at a super-block level. The program-erase count 410 can be calculated each time the memory devices 110 are accessed for a program operation or an erase operation. The program-erase count 410 can be used to determine if wear begins to deteriorate the integrity of the memory devices 110.

The super blocks 308 can include any number of unusable blocks 414, which are defined as blocks that are no longer available for access. If one of the erase blocks 310 is one of the unusable blocks 414, writing and recycling operations on the corresponding instance of the super blocks 308 can skip over the one of the erase blocks 310.

The super blocks 308 can include remapped blocks for the unusable blocks 414. The erase blocks 310 can represent spare blocks 416, which are blocks that are available for use. If the memory devices 110 include the spare blocks 416, one of the erase blocks 310 that is one of the unusable blocks 414 can be remapped to one of the spare blocks 416. Remapping is preferably not spanned over different instances of the memory devices 110.

There can be multiple levels of performance improvements having to do with both the super blocks 308 and the use of remapping of the erase blocks 310. The performance improvements from the use of the super blocks 308 can be from but not limited to the centralized storage of the metadata pages 408 in a single location instead of in each of the erase blocks 310 in the super blocks 308. Each access to one of the erase blocks 310 can incur a latency overhead of reading and writing. By only having to access one of the erase blocks 310 in the super blocks 308, there can be an effective elimination of multiple erase block accesses to retrieve the same amount of information. For reading and writing of the host data 405, the remapping function can allow each of the super blocks 308 to have a full complement of the erase blocks 310. All of the erase blocks 310 within one of the super devices 306 can be accessed in a parallel approach with the one of the super devices 306 active.

It has been discovered that the super blocks 308 spanning multiple of the memory channels 304 provide improved performance since multiple pages within each of the super blocks 308 are capable of being written concurrently.

It has also been discovered that multiple of the erase blocks 310 grouped into each of the super blocks 308 provide improved performance with reduced data management resources since there are fewer of the super blocks 308 than a number of the erase blocks 310 to manage and initialize.

It has further been discovered that the super blocks 308 spanning multiple of the chip selects 112 of the memory devices 110 provide improved reliability with an infrastructure that supports an internal redundant array of independent disks (RAID) architecture including RAID-5.

It has further been discovered that the super blocks 308 including a number of the erase blocks 310 that are bad or remapped provides improved memory resource utilization since the super blocks 308 with the unusable blocks 414 do not have to be thrown away but instead the unusable blocks 414 are able to be remapped with the spare blocks 416 thereby eliminating the shortcoming of traditional super blocks where a bad block renders the entire super block useless.

It has further been discovered that the super blocks 308 provide improved performance since there are fewer statistics, including the program-erase count 410 and the valid-page count 412, included in the metadata pages 408 that need to be managed.

It has further been discovered that remapping of the unusable blocks 414 provide improved performance since the super blocks 308 that are incomplete cause write performance degradation.

Figure 5:
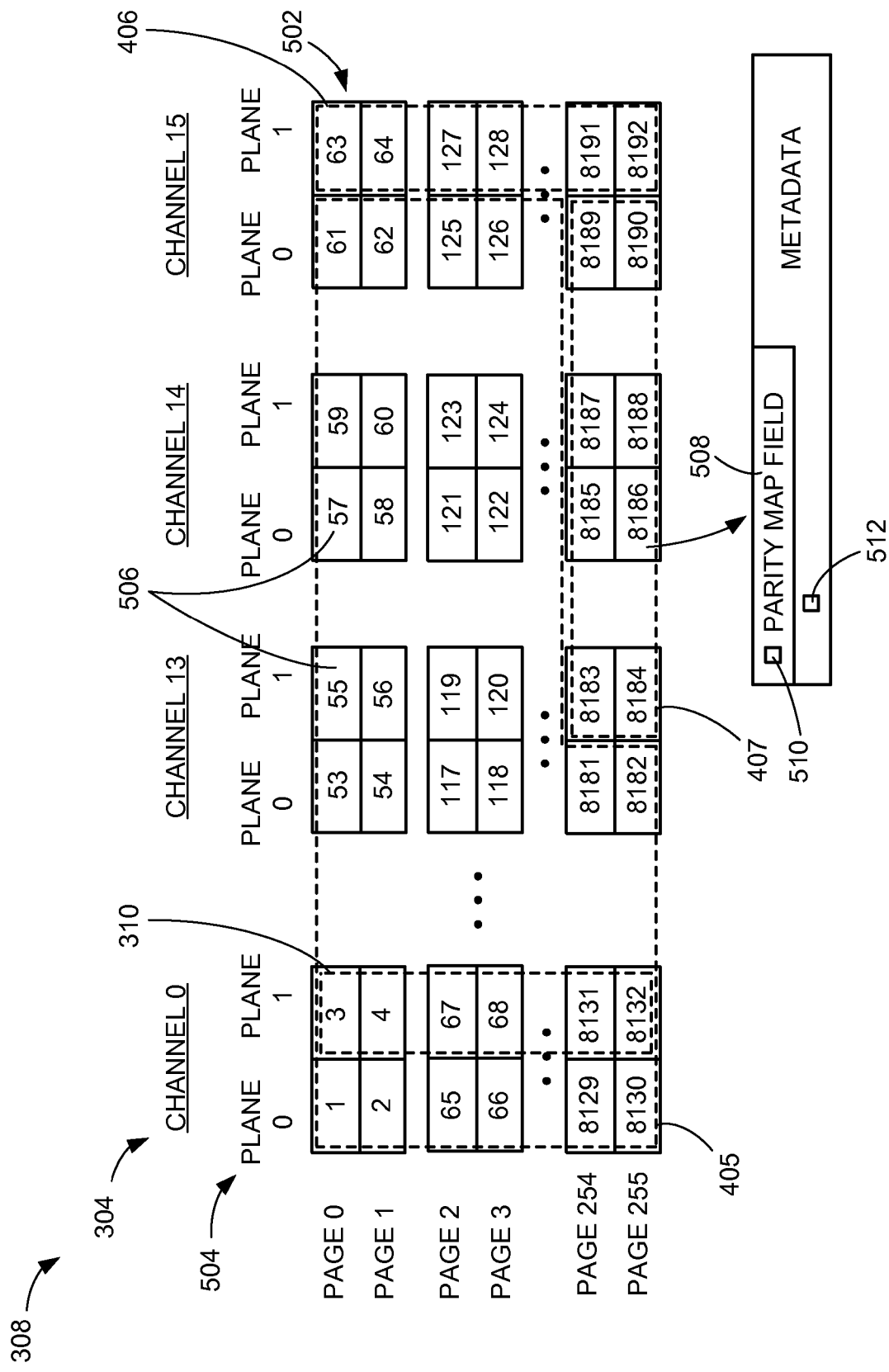
FIG. 5 is a first example diagram of one of the super blocks.

Referring now to FIG. 5, therein is shown a first example diagram of one of the super blocks 308. The first example diagram depicts one of the super blocks 308. For example, the first example diagram depicts a default location for the parity 406, shown as a parity stripe, within one of the super blocks 308. The default location refers to a location 502 of the parity 406 within each of the super blocks 308 when the super blocks 308 are formed. The location 502 is defined as a physical position within one of the super blocks 308 where the parity 406 is stored.

The structure of the super blocks 308 is provided to allow dynamic location of redundant array of independent disks (RAID) parity with selective assignments of the erase blocks 310 based on drive life and wear. The data structure of the super blocks 308 can be saved or stored across a power cycle where a solid-state drive (SSD) employs the use of MLC NAND flash.

Each of the memory channels 304 can be associated with a number of the memory devices 110 of FIG. 1. For illustrative purposes, one of the super blocks 308 is shown spanning across 16 of the memory channels 304, although it is understood that each of the super blocks 308 can span any number of the memory channels 304.

For example, for NAND flash memories, the memory devices 110 can represent dies or logical units (LUN). An important point is that the memory devices 110 can execute commands independently from each other allowing parallel operations. This independent operation is used to gain greater bandwidths and high I/O operations (IOPS).

Each of the memory devices 110 can include multiple planes 504, each of which can include a number of the erase blocks 310. Each of the erase blocks 310 can include a number of pages 506. The pages 506 are defined as memory components within each of the erase blocks 310 that are programmed as individual units. The pages 506 are smallest groups of data bytes that are read from or written to in each of the erase blocks 310. Each of the pages 506 can include a number of bytes.

The pages 506 can be grouped into each of the erase blocks 310, which are the smallest area that can be erased. Each of the pages 506 is the smallest region that is programmed. The erase blocks 310 can be organized in each of the planes 504, which can be grouped into a logical unit (LUN).

For example, a die can include approximately 4096 of the erase blocks 310 divided into two of the planes 504 with 2048 of the erase blocks 310 per each of the planes 504. Also for example, each of the erase blocks 310 can include 256 pages, each of which can include 8K bytes, where each 1K bytes includes 1024 bytes.

The first example diagram depicts one of the super blocks 308 having the host data 405, the metadata 407, and the parity 406, each of which can include any number of the pages 506. The parity 406 can be at any location within each of the super blocks 308. For illustrative purposes, the parity 406 is shown in one of the planes 504 of one of the memory channels 304, although it is understood that the parity 406 can be at any location within each of the super blocks 308.

The pages 506 of the metadata 407 can include a parity map field 508. The parity map field 508 is defined as information that is associated with the parity 406. The parity map field 508 identifies the location 502 of the parity 406 within each of the super blocks 308. The parity map field 508 can represent a parity location map or parity mapping.

The parity 406 can include any number of the pages 506. The parity 406 can be located in any of the planes 504 per each of the memory channels 304 or spanning across any number of the planes 504 within any number of the memory channels 304. The parity 406 can be located in any of the memory channels 304 or spanning across any number of the memory channels 304. The parity 406 can include a number of the pages 506 that are contiguous, the pages 506 that are separate from and not abut each other, or a combination thereof.

The parity map field 508 can optionally include flags 510, which are defined as information that is associated with the parity 406. The flags 510 can include information associated with test mode parameters that can be used to change the endurance and retention qualities of the parity 406. The test mode parameters can be used when a recovery needs to take place. The recovery does not happen very often and the time it takes to re-write the test mode parameters to use the parity 406 can be tolerated. The test mode parameters can be used to manipulate or change the erase blocks 310 to have more retention as opposed to more endurance, as an example.

A number of methods can be implemented to build the parity map field 508. For example, the host data 405 can be stored in the erase blocks 310 at the beginning of the super blocks 308 and the parity 406 in the last instances of the erase blocks 310. Also for example, the erase blocks 310 in the super blocks 308 do not need to be monotonically increasing in regards to the numbers of the memory channels 304. As a specific example, 16 of the memory channels 304 used in the erase blocks 310 can be ordered as 5, 15, 12, 11, 0, 2, 7, 9, 10, 1, 3, 13, 14, 4, 8, 6. In this case, the erase blocks 310 on channel 6 would contain the parity 406.

A means for identifying the pages 506 of the metadata 407 versus the pages 506 of the parity 406 can be determine by a signature value 512 in the pages 506 of the metadata 407. The signature value 512 is defined as information that is used to identify the pages 506 of the metadata 407. The signature value 512 is a sequence of data bytes that are unique such that they are different from the XOR parity data of the parity 406 in the same location within the erase blocks 310. The parity map field 508 can be redundant or the same in all of the pages 506 of the metadata 407 so it can be clearly or distinctly identified from the parity 406.

The super blocks 308 can be traversed by taking any number of passes through the memory channels 304. As an example, the super blocks 308 can be traversed by taking 2 passes through the memory channels 304.

Figure 6:
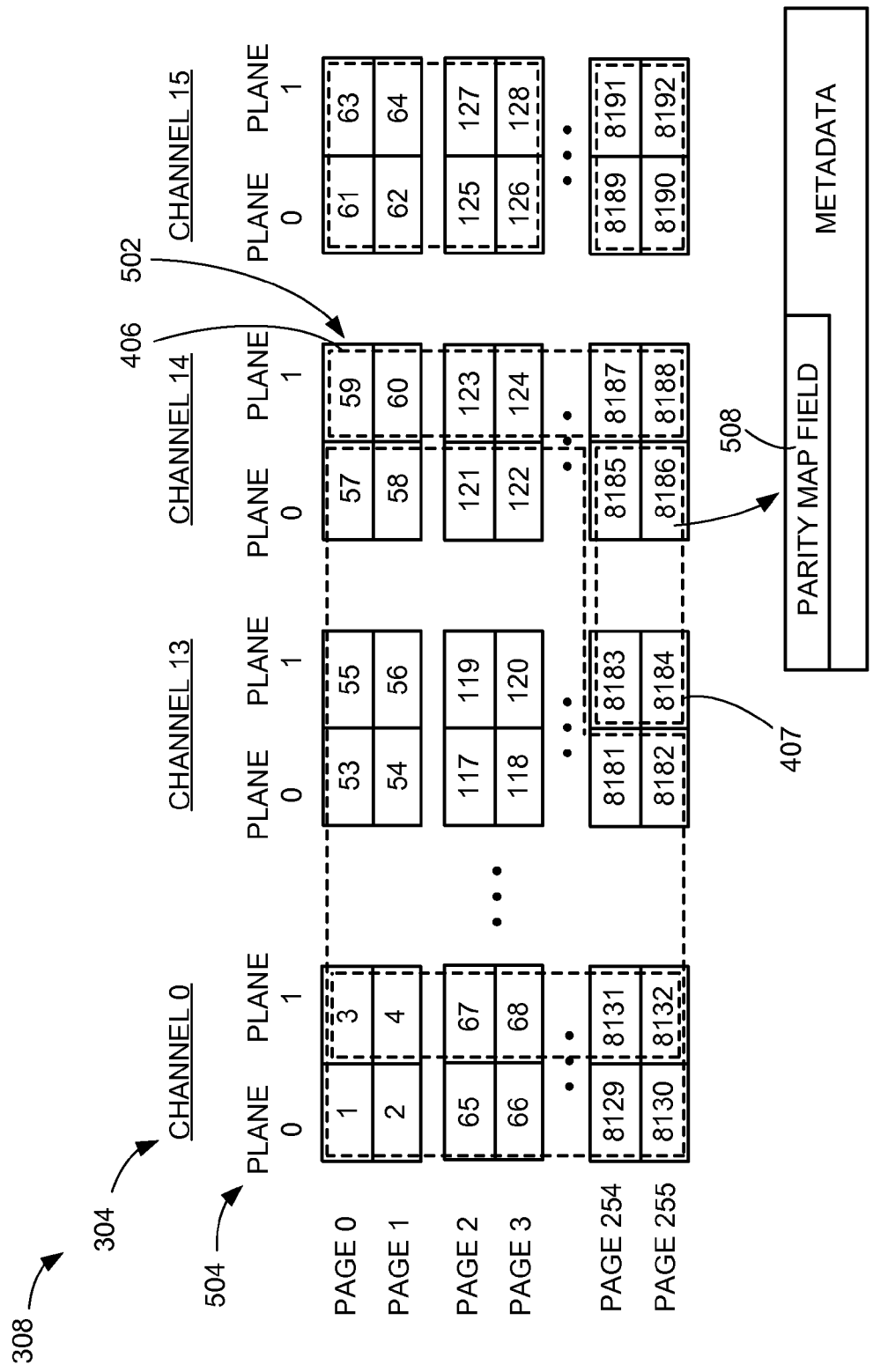
FIG. 6 is a second example diagram of one of the super blocks.

Referring now to FIG. 6, therein is shown a second example diagram of one of the super blocks 308. The second example diagram depicts one of the super blocks 308. The second example diagram is similar to the first example diagram except that the second example diagram depicts the location 502 of the parity 406, shown as a moved or alternate parity stripe that is different from the default location shown in FIG. 5.

The metadata 407 stored across multiple of the memory channels 304 or different instances of the planes 504 can include redundant parity mapping structures so that the parity map field 508 does not have to be stored in a given location. Any location within the super blocks 308 can be selected for the location of the parity 406. As an example, the parity 406 can be located in one of the planes 504 in one of the memory channels 304. As a specific example, FIG. 6 depicts the parity 406 located in plane 1 of channel 14.

Figure 7:
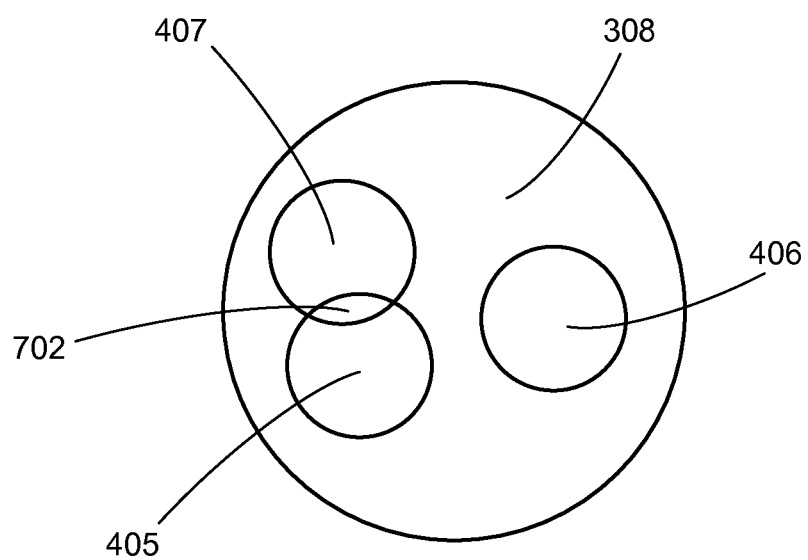
FIG. 7 is a third example diagram of one of the super blocks.

Referring now to FIG. 7, therein is shown a third example diagram of one of the super blocks 308. The third example diagram depicts one of the super blocks 308. The third example diagram is described by set theory as the erase blocks 310 of FIG. 3 are "members" of a "set". A set is defined as a collection of members, elements, or objects. There can be sets with other sets, as there are different types of the members within the set.

Each of the super blocks 308 can represent the set. The members of the set of each the super blocks 308 can include the host data 405, which can include a number of the pages 506 of FIG. 5 in one of the erase blocks 310.

The members of the set of each the super blocks 308 can also include information for the metadata 407, which can include extra information in the pages 506 of the host data 405 and extra information in the pages 506 that are stand-alone and not associated with the host data 405. The members of the set of each the super blocks 308 can also include the parity 406, including RAID parity information, which can provide protection for the pages 506 of both the host data 405 and the metadata 407.

Since there can be multiple members in each type of information, subsets can be formed within each of the super blocks 308 as the main set. The subsets are portions of the set. There can be intersections 702 between different memory types within each of the super blocks 308. For example, a number of the pages 506 of the metadata 407 can be held in or associated with the host data 405.

In each of the super blocks 308, membership is dynamic and can be "reassigned" in different physical instances of the erase blocks 310. This is to tolerate loss of functions due to the erase blocks 310 that are bad or unusable in one of the elements of the set of each of the super blocks 308.

Figure 8:
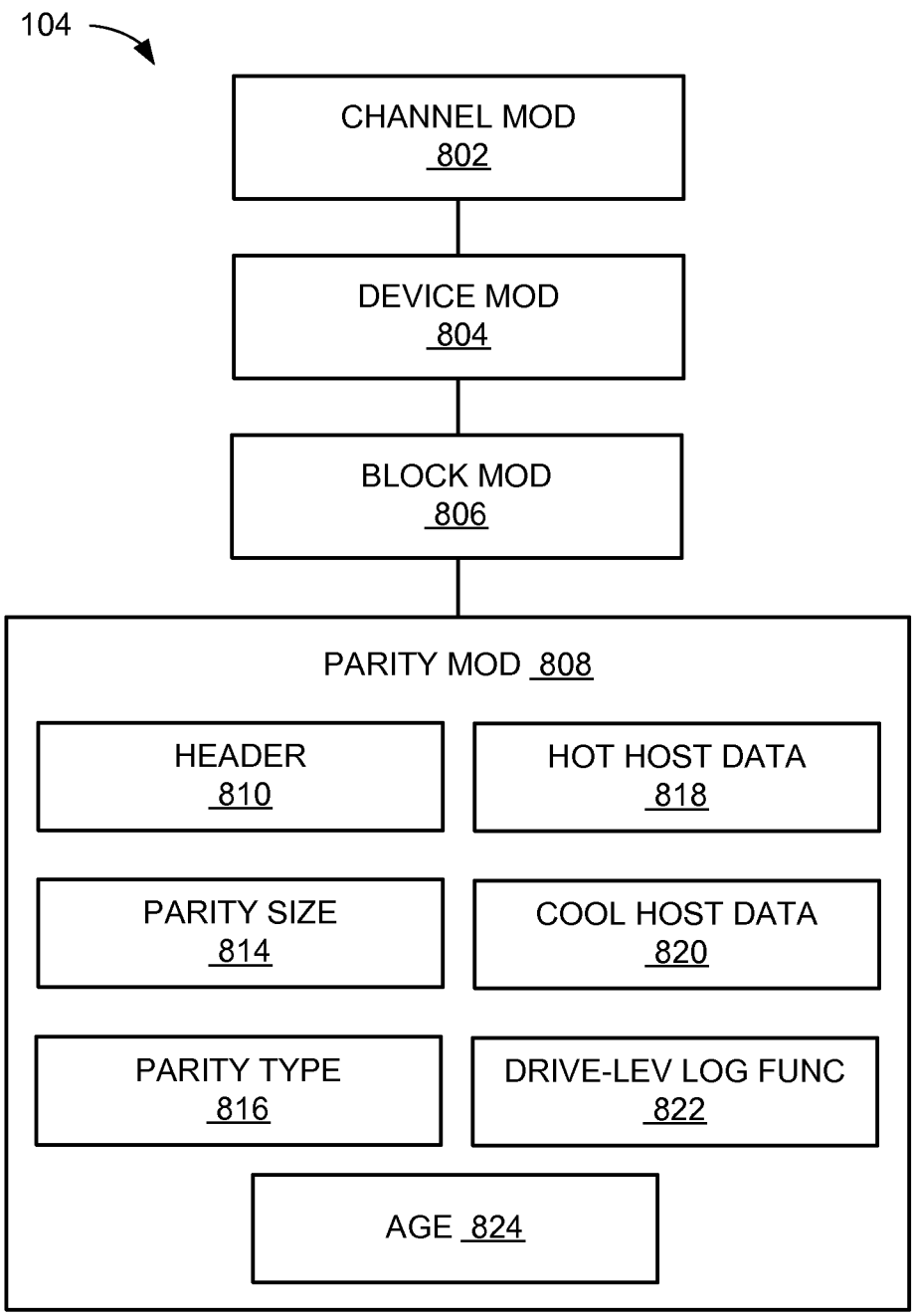
FIG. 8 is a control flow of the memory controller.

Referring now to FIG. 8, therein is shown a control flow of the memory controller 104. The control flow provides a dynamic data management of the parity 406 of FIG. 4 within the super blocks 308 of FIG. 3.

Protection of data can be implemented with FRAME using the parity 406. FRAME is a stripe of the host data 405 of FIG. 4, the metadata 407 of FIG. 4, or a combination thereof protected by the parity 406. The location of the elements inside the FRAME or "stripe" is dynamic.

The memory controller 104 can include a channel module 802 for performing operations associated with the memory channels 304 of FIG. 3. The channel module 802 can partition each of the memory channels 304 that are associated with a number of the memory devices 110 of FIG. 1.

The memory controller 104 can include a device module 804 for performing operations associated with the super devices 306 of FIG. 3. The device module 804 can identify or select the super devices 306. The super devices 306 can include portions of the memory channels 304. The super devices 306 can be selected with one of the memory devices 110 from one of the memory channels 304.

The device module 804 can group the memory devices 110 from the memory channels 304 to form the super devices 306. The super devices 306 can include a number of the memory devices 110 that are controlled in parallel across a number of the memory channels 304. The super devices 306 can be constructed with or associated with any number of the memory channels 304 that are executed in parallel. The number of the super devices 306 can be based on a number of independently accessible instances of the memory devices 110 on the memory channels 304 selected by Chip Enables (CEs), logical units (LUN), or a combination thereof.

One or more of the super devices 306 can be formed by taking multiple passes through the memory channels 304. For example, if there are 16 of the memory channels 304, one or more of the super devices 306 can be formed across 8 of the memory channels 304 or 16 of the memory channels 304. Also for example, any number of passes or partial passes can be taken through the memory channels 304 to traverse the super devices 306. As a specific example, 1.5 or 2 passes can be taken through the memory channels 304. If one of the memory channels 304 is used twice, two different dies can be used on the one of the memory channels 304 so that the parity 406 provides protection from a plane failure.

The memory controller 104 can include a block module 806 for performing operations associated with the super blocks 308. Each of the super blocks 308 can be identified and selected by the block module 806. Each of the super blocks 308 is a group of the erase blocks 310 of FIG. 3 that span across multiple of the memory channels 304 within one of the super devices 306.

As an example, each of the memory devices 110 in the super blocks 308 can contribute a pair of the erase blocks 310 that can be accessed together. Each of the super blocks 308 can be selected to be associated with the super devices 306. Each of the super blocks 308 can be accessed via and associated with only one of the super devices 306.

Since the super devices 306 span across multiple of the memory channels 304, the super blocks 308 can also span across multiple of the memory channels 304. The term "spanning across" used above for the super blocks 308 refers to portions of different instances of the memory channels 304 are included in each of the super blocks 308.

All the chip selects 112 of FIG. 1 of the memory devices 110 can be partitioned into groups that can be controlled by the super chip selects 404 of FIG. 4. The super chip selects 404 can be selected by the block module 806. The super chip selects 404 can be selected by partitioning the chip selects 112. The super chip selects 404 are provided by the block module 806 to control operation of the memory devices 110.

The super chip selects 404 can be used to assert or de-assert the chip selects 112. The chip selects 112 can be asserted or de-asserted to enable or disable, respectively, the memory devices 110. For example, the chip selects 112 can be asserted or de-asserted by the block module 806 assigning the super chip selects 404 to an active or inactive state such that the chip selects 112 are driven to logic '1' or '0', respectively, to enable or disable the memory devices 110.

Read-write and read-erase conflicts can be minimized by the block module 806. The conflicts can be minimized by partitioning the super blocks 308 using the super chip selects 404. By rebalancing the super blocks 308 when recycling, a number of valid pages can be rebalanced between the chip selects 112.

The pages 506 of FIG. 5 of the metadata 407 can be written by the block module 806 to include logical page indexes. The pages 506 of the metadata 407 can be grouped and written once per each of the super blocks 308 as opposed to keeping the metadata 407 in each of the erase blocks 310. This grouping of the metadata 407 can also make traversing the metadata 407 during drive initialization more efficient.

Multiple of the erase blocks 310 grouped into each of the super blocks 308 by the block module 806 provide several advantages. One of the advantages is that there are fewer of the super blocks 308 than a number of the erase blocks 310 to manage and initialize by the block module 806. Instead of managing lists of the erase blocks 310, lists of the super blocks 308 can be managed by the block module 806. As a result, data management resources including management data structures for managing the super blocks 308 are smaller or less.

A number of the erase blocks 310 in each of the super blocks 308 can be determined by the super devices 306 of FIG. 3. For example, each of the super blocks 308 can include at least 16 of the erase blocks 310. Another advantage of the super blocks 308 is that the super blocks 308 can include a number of the erase blocks 310 that are bad or remapped. If one of the super blocks 308 includes a number of the erase blocks 310 that are bad blocks, the entirety of the one of the super blocks 308 would not be rendered as useless. The erase blocks 310 that are bad or unusable can be remapped by the block module 806.

The memory controller 104 can include a parity module 808 for determining the parity 406 and the location 502 of FIG. 5 of the parity 406 in the super blocks 308. The parity 406 can be calculated by the parity module 808 using exclusive-OR (XOR) binary operation performed on data to be stored.

During the normal operation of a solid-state drive (SSD), the use of NAND wears the NAND to an unreliable state. This wear is not always even in a pool of the erase blocks 310 and some NAND wears much faster than others do. One way to protect against this uneven wear is to provide a RAID type parity protection. One problem that exists is when the logical unit (LUN) or die is selected, for use as the parity information, is either unreliable or worse is completely unusable.

To solve the problem above, the location 502 of the parity 406 is determined based on a dynamic mapping of the parity 406 that is tracked at the super block level. The term "dynamic" in the dynamic mapping refers to determining the location 502 of the parity 406 within one of the super blocks 308 whenever the one of the super blocks 308 is formed. As such, the dynamic mapping allows the location 502 of the parity 406 to be different whenever the one of the super blocks 308 is formed as opposed to the location 502 of the parity 406 being fixed in the super blocks 308. As the erase blocks 310 in the super blocks 308 become unreliable or unusable, the super blocks 308 are formed or regenerated during normal operation of the SSD using the erase blocks 310 that are reliable or usable.

The location 502 is determined based on the erase blocks 310 that are reliable or usable. For example, the erase blocks 310 are determined as reliable or usable when the erase blocks 310 are written with predetermined data and subsequently read with the same data that was written. Also for example, the erase blocks 310 are determined as reliable or usable when a number of the program/erase cycles of the erase blocks 310 is below a predetermined threshold.

The location 502 of the parity 406 of each of the super blocks 308 can be provided in a header 810 of each of the super blocks 308. The header 810 is defined as a portion of each of the super blocks 308 that is used to store information associated with the super blocks 308. For example, the header 810 can represent a top portion of each of the super blocks 308.

The header 810 can include a table that describes participants or members of the super blocks 308. For example, the participants or the members can include the host data 405, the metadata 407, the parity 406, and any other types of information stored in the super blocks 308.

The location 502 of the parity 406 of each of the super blocks 308 can be provided by the parity map field 508 of FIG. 5. Mapping of the parity 406 can be provided using the parity map field 508 in each of the super blocks 308. The location 502 of the parity 406 can be located anywhere within each of the super blocks 308. The location 502 of the parity 406 can be different in each of the super blocks 308 when each of the super blocks 308 is formed or regenerated during operation of the SSD. For example, when any of the pages 506 of the erase blocks 310 is not reliable, functional, or usable, the parity 406 can be moved to a different location within the one of the super blocks 308 such that the parity 406 can be constructed using the erase blocks 310 that are usable and available for storing the parity 406.

There can be multiple of the pages 506 of the metadata 407 for storing multiple redundant instances of the parity map field 508. The multiple redundant instances of the parity map field 508 provide additional protection for the location 502 of the parity 406. When one or more of the pages 506 of the metadata 407 that includes one of the multiple redundant instances of the parity map field 508 is unreadable, other instances of the pages 506 of the metadata 407 that include the multiple redundant instances can be read. When two or more of the multiple redundant instances are compared to be the same, the parity map field 508 is determined to be valid.

The parity module 808 can determine a parity size 814 of the parity 406. The parity size 814 is defined as information that indicates an amount of the parity 406. The parity size 814 can be calculated based on a number of bytes, the pages 506, the erase blocks 310, or any other units that indicate amount of information.

The parity size 814 can be determined based on a number of the erase blocks 310 that are reliable or usable in the super blocks 308. The parity 406 can provide sizable parity protection mapped in each individual instance of the super blocks 308. For example, the parity size 814 of the parity 406 in one of the super blocks 308 can be greater than that of the parity 406 in another of the super blocks 308 with fewer of the erase blocks 310 than the one of the super blocks 308. In other words, the parity 406 covers fewer amount of information if there are fewer of the erase blocks 310 in the super blocks 308.

The parity module 808 can determine a parity type 816 for the parity 406. The parity type 816 is defined as an identification of information stored within one of the super blocks 308 that the parity 406 protects. The parity type 816 can be determined for each of the participants or the members in each of the super blocks 308. Different types of data stored in the super blocks 308 can be allowed to have different amounts of parity protection using multiple of the parity 406 within the super blocks 308.

The parity type 816 can be determined based on the kinds of data stored within the super blocks 308. The data stored within the super blocks 308 that the parity 406 protects can include hot host data 818, cool host data 820, different types of multiple of the metadata 407, drive-level logging functions 822, and SCRAM or drive-related emergency shutdown information. The drive-level logging functions 822 are information that is associated with control or status of a data storage device. For example, the drive-level logging functions 822 can be associated with informational messages, error events, mapping transactions, and unbound metadata.

The hot host data 818 is defined as the host data 405 stored in a portion of one of the super blocks 308 that gets more number of data write accesses compared to the host data 405 stored in other portions of the one of the super blocks 308. The cool host data 820 is defined as the host data 405 stored in a portion of one of the super blocks 308 that gets less number of data write accesses compared to the host data 405 stored in other portions of the one of the super blocks 308.

The hot host data 818 can get more parity protection than the cool host data 820 does due to different retention or endurance rates between the hot host data 818 and the cool host data 820. The parity size 814 of the parity 406 for the hot host data 818 can be greater than that of the parity 406 for the cool host data 820.

There can be a number of the location 502 for a number of the parity 406, each of which provides protection for different data based on the parity type 816. For example, the number of the parity 406 can provide protection for the hot host data 818, the cool host data 820, the metadata 407, the drive-level logging functions 822, and the SCRAM or drive-related emergency shutdown information.

For example, the parity map field 508 can identify multiple of the location 502 of multiple of the parity 406. Also for example, there can be multiple of the parity map field 508 in one of the super blocks 308, each of which identifies the location 502 of each of multiple of the parity 406, providing the one of the super blocks 308 having more than one parity layout. Each of the multiple of the parity map field 508 can be located at different sections of the one of the super blocks 308.

The parity 406 can cover the host data 405 based on plane failures associated with the planes 504 of FIG. 5. The parity 406 can be dynamically allocated to different instances of the planes 504 in the memory channels 304.

For example, when one of the planes 504, such as an odd or an even plane, in one of the memory channels 304 fails or is unusable for reliable operation, the parity 406 can be allocated to another of the planes 504 in the one of the memory channels 304 or one of the planes 504 in another of the memory channels 304 in the same instance of the super blocks 308. As a specific example, when one of the planes 504 of one of the memory channels 304, shown as plane 1 in channel 15 in FIG. 5, fails to be reliable, the parity 406 can be allocated to one of the planes 504 of another of the memory channels 304, shown as plane 1 in channel 14 in FIG. 6.

The parity module 808 can determine the parity 406 based on an age 824 of each the super blocks 308, for which the parity 406 protects. The age 824 associated with one of the super blocks 308 is defined as duration of how long the one of the super blocks 308 is used since it is formed or regenerated. The super blocks 308 having different values of the age 824 can dynamically have different parity strengths, which are mapped on a per super block basis. For example, one of the super blocks 308 can have the parity 406 with the parity size 814 greater than the parity size 814 of the parity 406 of another of the super blocks 308 when the one of the super blocks 308 has the age 824 greater than the age 824 of the another of the super blocks 308.

Having one of the erase blocks 310 with the parity 406 per each of the super blocks 308 provides plane-level protection. Having one or more of the erase blocks 310 with two of the parity 406 per each of the super blocks 308 provides die-level protection provided that there are two physical planes in a die.

Functions or operations of the memory controller 104 as described above can be implemented with the control unit 202 of FIG. 2, the storage unit 204 of FIG. 2, the memory interface unit 206 of FIG. 2, the host interface unit 208 of FIG. 2, or a combination thereof. For example, the channel module 802 can be implemented with the control unit 202 to partition the memory channels 304 with the memory devices 110. Also for example, the device module 804 can be implemented with the control unit 202 to select the super devices 306 with one of the memory devices 110 from one of the memory channels 304.

As an example, the block module 806 can be implemented with the control unit 202 to select the super blocks 308 associated with an instance of the super devices 306 or the super chip selects 404. As another example, the parity module 808 can be implemented with the control unit 202 to determine the location 502 of the parity 406 within the super blocks 308 when the super blocks 308 are formed.

The device module 804 can be coupled to the channel module 802. The block module 806 can be coupled to the device module 804. The parity module 808 can be coupled to the block module 806.

It has been discovered that the location 502 of the parity 406 within the super blocks 308 provides improved reliability by determining the location 502 based on the erase blocks 310 that are reliable or usable whenever the super blocks 308 are formed. During the normal operation of the SSD, the use of NAND wears the NAND to an unreliable state. This wear is not always even in the pool of erase blocks and some NANDs wear much faster than others do. One way to protect against this uneven wear is to provide a RAID type parity protection. One problem that exists is when the logical unit (LUN) or die selected, for use as the parity information, is either unreliable or worse is completely unusable. The location 502 of the parity 406 dynamically determined based on a dynamic mapping of the parity 406 based on the erase blocks 310 that are reliable or usable whenever the super blocks 308 are formed during the operation of the SSD solves this problem thereby providing the improved reliability.

It has also been discovered that the parity size 814 provides improved reliability since the parity size 814 is determined based on a number of the erase blocks 310 that are reliable or usable in the super blocks 308.

It has further been discovered that the parity type 816 provides improved reliability since the parity type 816 identifies types of data stored in the super blocks 308 that a number of the parity 406 protect.

It has further been discovered that the age 824 provides improved reliability by the age 824 indicating duration of how long the super blocks 308 have been formed for the parity 406 to be generated to reliably protect the super blocks 308 since the super blocks 308 having different values of the age 824 need different parity strengths.

The storage control system 100 of FIG. 1 is described module functions or order as an example. The modules can be partitioned differently. For example, the channel module 802 and the device module 804 can be combined. Each of the modules can operate individually and independently of the other modules.

Furthermore, data generated in one module can be used by another module without being directly coupled to each other. For example, the parity module 808 can receive information associated with the memory channels 304 partitioned by the channel module 802 to determine the location 502 of the parity 406 within the erase blocks 310 in one of the memory channels 304. The channel module 802, the device module 804, the block module 806, and the parity module 808 can be implemented as hardware accelerators (not shown) within the control unit 202 or can be implemented as hardware accelerators (not shown) in the memory controller 104 or outside of the memory controller 104.

Figure 9:
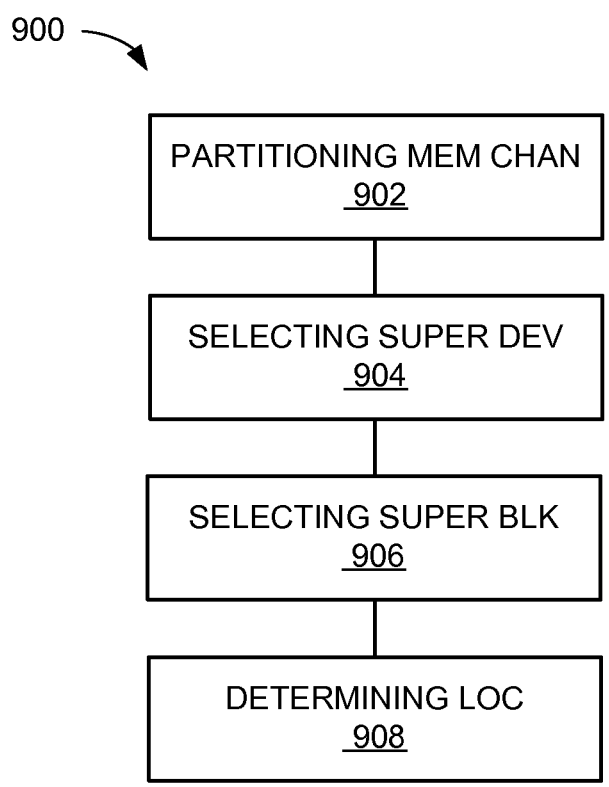
FIG. 9 is a flow chart of a method of operation of the storage control system in a further embodiment of the present invention.

Referring now to FIG. 9, therein is shown a flow chart of a method 900 of operation of the storage control system 100 of FIG. 1 in a further embodiment of the present invention. The method 900 includes: partitioning memory channels with memory devices in a block 902; selecting a super device with one of the memory devices from one of the memory channels in a block 904; selecting a super block associated with the super device in a block 906; and determining a location of a parity within the super block when the super block is formed in a block 908.

Thus, it has been discovered that the storage control system of the present invention furnishes important and heretofore unknown and unavailable solutions, capabilities, and functional aspects for a storage control system with data management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage control system comprising a plurality of memory devices partitioned into a plurality of memory groups, the method comprising:
   forming a plurality of super blocks, including:
      assigning a first set of blocks from a first subset of the plurality of memory devices to a first super block of the plurality of super blocks, the first subset including at least one memory device from each of two or more of the memory groups;
      assigning a second set of blocks from a second subset of the plurality of memory devices to a second super block of the plurality of the super blocks, the second subset including at least one memory device from each of two or more of the memory groups;
      based on distinct reliabilities of individual erase blocks within the first super block, assigning first parity locations within the first super block for storing parity data within the first super block; and
      based on distinct reliabilities of individual erase blocks within the second super block, assigning second parity locations within the second super block for storing parity data within the second super block;
   wherein relative locations within the second super block of the second parity locations are distinct from relative locations within the first super block of the first parity locations.

2. The method as claimed in claim 1 wherein assigning first parity locations within the first super block for storing parity data within the first super block includes assigning multiple blocks for storing parity data within the first super block.

3. The method as claimed in claim 1 wherein assigning the first parity locations includes assigning the first parity locations within an erase block of the first set of blocks.

4. The method as claimed in claim 3 wherein a first memory group of the plurality of memory groups comprises a plurality of planes, and a first plane of the plurality of planes includes the erase block.

5. The method as claimed in claim 1 further comprising storing a reference to the first parity locations in a parity map field within metadata associated with the first super block.

6. The method as claimed in claim 1 further comprising, after forming the plurality of super blocks:
   obtaining host data;
   generating parity data corresponding to the obtained host data; and
   storing the parity data at the first parity locations.

7. The method as claimed in claim 6 wherein generating the parity data comprises assigning the parity data a parity type based on one or more attributes of the host data.

8. The method as claimed in claim 6 further comprising: after forming the plurality of super blocks, storing the host data within the first super block, and storing metadata associated with the host data within the first super block.

9. The method as claimed in claim 6 wherein generating the parity data comprises generating the parity data based on an age of the first super block.

10. The method as claimed in claim 1 further comprising storing a reference to the first parity locations in multiple instances of a parity map field in metadata associated with the first super block.

11. The method as claimed in claim 1, wherein assigning the first parity locations includes assigning a first parity size such that the first parity locations and the first parity size designate a subset of the first set of blocks as blocks for use in storing parity data;
wherein assigning the second parity locations includes assigning a second parity size such that the second parity locations and the second parity size designate a subset of the second set of blocks as blocks for use in storing parity data; and
wherein the first parity size is distinct from the second parity size.

12. A storage control system comprising: a plurality of memory devices partitions into a plurality of memory groups; and
a storage controller coupled to the plurality of memory devices, the storage controller configured to:
form a plurality of super blocks by: assigning a first set of blocks from a first subset of the plurality of memory devices to a first super block of the plurality of super blocks, the first subset including at least one memory device from each of two or more of the memory groups;
assigning a second set of blocks from a second subset of the plurality of memory devices to a second super block of the plurality of the super blocks, the second subset including at least one memory device from each of two or more of the memory groups;
based on distinct reliabilities of individual erase blocks within the first super block, assigning first parity locations within the first super block for storing parity data within the first super block; and
based on distinct reliabilities of individual erase blocks within the second super block, assigning second parity locations within the second super block for storing parity data within the second super block;
wherein relative locations within the second super block of the second parity locations are distinct from relative locations within the first super block of the first parity locations.

13. The system as claimed in claim 12 wherein the storage controller is further configured to assign multiple blocks within the first super block for storing parity data within the first super block.

14. The system as claimed in claim 12 wherein the first set of blocks includes an erase block, and the erase block comprises the first parity locations.

15. The system as claimed in claim 14 wherein a first memory group of the plurality of memory groups comprises a plurality of planes, and a first plane of the plurality of planes includes the erase block.

16. The system as claimed in claim 12 further comprising metadata associated with the first super block, wherein the metadata comprises a parity map field and the parity map field includes a reference to the first parity locations.

17. The system as claimed in claim 12 wherein the storage controller is further configured to:
obtain host data;
generate parity data corresponding to the obtained host data; and
store the parity data at the first parity locations.

18. The system as claimed in claim 17 wherein generating the parity data comprises assigning the parity data a parity type based on one or more attributes of the host data.

19. The system as claimed in claim 17 wherein the storage controller is further configured to: after forming the plurality of super blocks, store the host data within the first super block, and store metadata associated with the host data in the first super block.

20. The system as claimed in claim 17 wherein generating the parity data comprises generating the parity data based on an age of the first super block.

21. The system as claimed in claim 12 further comprising metadata associated with the first super block, wherein the metadata comprises multiple instances of a parity map field, and each instance of the parity map field includes a reference to the first parity locations.

22. The system as claimed in claim 12, wherein assigning the first parity locations includes assigning a first parity size such that the first parity locations and the first parity size designate a subset of the first set of blocks as blocks for use in storing parity data;
wherein assigning the second parity locations includes assigning a second parity size such that the second parity locations and the second parity size designate a subset of the second set of blocks as blocks for use in storing parity data; and
wherein the first parity size is distinct from the second parity size.

* * * * *